Sept. 19, 1933.  C. I. HALL  1,927,795
PROTECTIVE SYSTEM
Filed Sept. 19, 1930
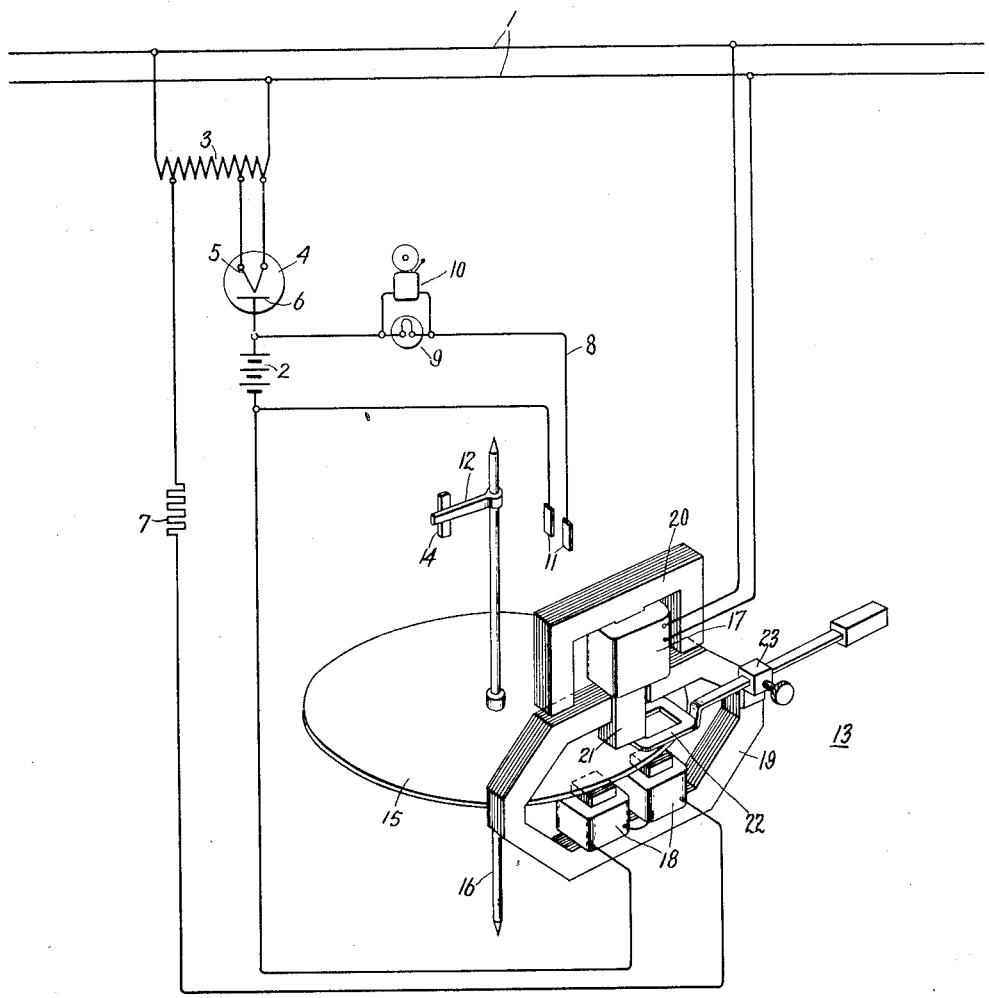
Inventor:
Chester I. Hall,
by Charles E. Tullar
His Attorney.

Patented Sept. 19, 1933

1,927,795

UNITED STATES PATENT OFFICE 1,927,795

PROTECTIVE SYSTEM

Chester I. Hall, Philadelphia, Pa., assignor to General Electric Company, a corporation of New York Application September 19, 1930
Serial No. 483,050

11 Claims. (Cl. 177—311)

My invention relates to protective systems, and particularly to alarm systems for storage battery trickle charging systems.

It is now fairly customary to provide theatres and similar buildings with an emergency source of current for the exit lights which is automatically connected to these lights whenever the main current source fails. This emergency source is usually a storage battery which in many cases is kept charged by floating it continuously across the main current supply. As the main current supply is in most cases an alternating current circuit, the battery is floated across this circuit through a rectifier, usually of the well-known trickle charging type.

In a system of this type, as well as in many other systems, it is important to know at all times that the battery charging circuit is operative, for otherwise the battery may be in a discharged condition, when it is called upon to energize the exit lights.

In most present day systems of this type, the trickle charging current is quite small, varying usually from two one hundredths of an ampere to one half an ampere depending largely upon the size of the battery. A relay or other device for controlling an alarm or signal or control circuit upon failure of the charging current must, therefore, be very sensitive. Furthermore, the voltage drop in such a relay must be small in order not to lower the voltage available for charging the battery. The energy available for operating such a relay is therefore not very large, it being in many cases less than six watts. Furthermore, as the trickle charger is usually only a half wave rectifier an alternating current relay will chatter and a direct current relay will not pick up because of the pulsatory nature of the current.

In accordace with my invention, I provide a sensitive relay for use in trickle charging systems which closes a control or signal circuit upon the failure of charging current only while the source of charging current is energized. Such a condition is brought about by a break in the charging circuit as by a failure of the trickle charging rectifier.

An object of my invention is to provide a new and improved battery charging alarm or control system.

Another object of my invention is to provide a new and improved protective relay which is adapted to be actuated by failure of the current in a load circuit only while the source of current is energized.

My invention will be better understood from the following description taken in connection with the accompanying drawing and its scope will be pointed out in the appended claims.

Referring now to the single figure of the accompanying drawing, wherein I have shown a preferred embodiment of my invention, 1 is an alternating current supply circuit which is connected to charge a storage battery 2 which may be the emergency source of an emergency lighting system, through a trickle charging device comprising a transformer 3 and a half wave rectifier 4 of the space discharge type. Rectifier 4 comprises a filament 5 and a plate 6, the former being heated to incandescence by being connected across low voltage taps on transformer 3. The operation of this device is very simple and is well understood by those skilled in the art. It is based upon the fact that there can only be an electron flow from the filament to the plate and consequently there can only be a current flow in the rectifier when the plate 6 is positive with respect to the filament. Transformer 3 may be of any suitable type and is shown as an auto transformer. A resistance 7 may be inserted in the charging circuit if desired in order to lower the charging rate. A normally open signal circuit is connected across battery 2 and includes a visual signal 9 and an audible signal 10. Contacts 11 in this circuit cooperate with a movable contact 12 for completing the circuit. Visual signal 9 may, if desired, be an exit light of an emergency lighting system.

For causing contact 12 to bridge contacts 11 thereby to close the signal circuit upon failure of charging current while circuit 1 is energized, I provide a protective relay 13. This relay resembles an induction watthour meter with the bridging contact 12 fastened to a shaft 16 of its rotatable member and a pair of stops 11 and 14 for limiting the motion of this contact. These stops comprise contacts 11 for limiting the motion of contact 12 in one direction to a critical position and a stop 14 for limiting the motion of contact 12 in the other direction.

Relay 13 comprises an inductor disc 15 of conducting non-magnetic material which is mounted on a shaft 16, the latter being free to rotate. Associated with this disc is an assembly of electromagnetic elements comprising a potential winding 17, which is connected across circuit 1 and a pair of current windings 18 which are connected in series in the charging circuit of battery 2. Suitable cores and pole pieces 19, 20, and 21, are provided for the coils 17 and 18.

An element 22 variously known as a lag plate or shading coil is adjustably mounted on magnetic member 19 by means of a bracket 23. Potential coil 17 is highly inductive so that current in it lags the current in current coils 18 by very nearly 90 degrees.

The operation of the illustrated embodiment of my invention is as follows: Assume that supply circuit 1 is energized by any suitable source of alternating current (not shown) and that battery 2 is being charged at its normal rate. Under these conditions, the unidirectional pulsating charging current flowing in current coil 18 and the alternating current flowing in potential coil 17 will produce fluxes which induce currents in the rotating member 15. Due to the fact that these fluxes are out of time phase as well as being displaced from each other in space a travelling electromagnetic field will be produced which reacting with the induced currents in disc 15 will produce a torque in the disc 15. The coils are so arranged that under normal conditions this torque will be clockwise, thus tending to press bridging contact 12 against stop 14. If now the current in the charging circuit should fall to zero as by failure of the rectifier, the torque due to the interaction of the potential coil flux and current coil flux is zero. I, however, adjust the shading coil 22 so that the face of the pole 21 will be shaded thereby. This has the effect of shading part of the flux due to the potential coil 17, which passes through pole 21, thus displacing it in space and it has the additional effect of displacing part of the flux in pole 21 in time phase with the rest of the flux. This is because the current in shading coil 22 which produces a flux is actually induced by the flux which is produced by the potential coil. The effect of so shading pole 21 is to produce a travelling magnetic field and this will induce current in disc 15 with the result that a torque is produced tending to turn disc 15. Disc 15, pole 21, coil 17, and shading coil 22 thus form a small split phase induction motor. I so adjust the shading coil 22 that this torque is opposite to the power torque produced by the joint action of the potential coil and the current coil. Thus, when the charging current fails, the torque due to the shading coil tends to move contact 12 into bridging engagement with contacts 11 thereby to complete the signal circuit. Under normal conditions, that is, when current is flowing in the charging circuit, the torque induced by the joint action of the current and potential coils is larger than the opposing torque induced by the shading coil. It will thus be seen that under normal conditions, signal circuit 8 is open, but if the rectifier fails or if for any other reason the current in the charging circuit should fail while the voltage of circuit 1 is maintained, relay 13 will act to close the signal circuit 8.

If the voltage of circuit 1 drops to zero there will, of course, be no current in the charging circuit of the battery and therefore as all of the coils of relay 13 are deenergized, there will be no torque produced in the disc 15 and it will remain stationary.

Although I have shown the signal circuit 8 including a visual and an audible signal, it will, of course, be obvious to those skilled in the art that my invention is not so limited and that if desired, contact 12 might be considered as a mechanical signal which in the position it occupies when bridging contacts 11 may be considered as giving a signal. It will also be obvious to those skilled in the art that my invention is not necessarily limited to giving a signal and that relay 13 might be employed to act upon a control circuit instead of a signal circuit. Thus, for example, it might control a circuit to insert an auxiliary rectifier in the battery charging circuit in case of failure of the original rectifier. without departing from my invention in its broader aspects.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a pair of electric circuits, a translating device connecting said circuits, and protective means including a movable means having a critical position to which it is urged by the failure of current in one of said circuits provided voltage is maintained on the other of said circuits.

2. In combination, a pair of electric circuits, a translating device connecting said circuits and protective means including an element operable to a critical position, an element responsive to the voltage of one of said circuits and an element responsive to the current in the other of said circuits, said voltage responsive element tending to urge said first mentioned element to its critical position and said voltage and current responsive elements together tending to urge said first mentioned element from its critical position.

3. In combination, a pair of electric circuits, a translating device connecting said circuits and movable means operative in accordance with failure of current in one of said circuits while voltage is maintained on the other of said circuits including means for producing opposed torques which are functions respectively of the current in said first mentioned circuit and the voltage of said last mentioned circuit.

4. In combination, a pair of electric circuits, a translating device connecting said circuits and movable means operating in response to failure of said translating device including elements for producing opposite torques which are functions respectively of the voltage of one of said circuits alone and of both the voltage of said circuit and the current in the other circuit.

5. In combination, an energy supply circuit, a load circuit, a translating device connecting said circuits, and protective means operative in response to failure of said translating device comprising a watthour meter type relay having its potential windings connected across said supply circuit and its current windings connected in said load circuit.

6. An alternating current supply circuit, a load circuit, a translating device connecting said circuits, a rotatably mounted armature, a potential winding connected across said supply circuit, a shading coil associated with said potential winding, said potential winding and shading coil providing a torque in said armature, a current winding connected to carry a current which is proportional to the current in said load circuit, said potential winding and said current winding producing a torque in said armature which opposes said first mentioned torque.

7. In combination, an alternating current supply circuit, a load circuit, a rectifier connecting said circuits and means comprising a watthour meter type relay having a potential winding connected across said supply circuit and a current winding connected in said load circuit, said means assuming an indication controlling position upon the failure of current in said load circuit if said supply circuit is energized.

8. In combination, an alternating current supply circuit, a direct current load circuit, a half wave rectifier connecting said circuits, a protective relay comprising an induction watthour meter type operating element having a potential winding connected across said supply circuit, a current winding connected in said load circuit, and a lag plate, said element producing a torque in one direction due to the two windings and a torque in the opposite direction due to the position of the lag plate.

9. In combination, a source of alternating current, a storage battery, a rectifier for charging said battery from said source, an alarm circuit, and one means for closing said alarm circuit upon the failure of charging current if said source of alternating current is energized, but preventing closure of said alarm circuit if said source is de-energized.

10. A battery charging alarm system having, in combination, an alternating current supply circuit, a storage battery, a half wave rectifier for charging said battery from said supply circuit, a relay comprising an induction watthour meter type operating element having potential and current windings connected respectively across said supply circuit and in series with said battery, and a signal circuit, said relay being adapted to close said signal circuit upon failure of current in said battery while said supply circuit is energized.

11. In an emergency lighting system, an alternating current supply circuit, an emergency source of current comprising a storage battery, a half wave rectifier for trickle charging said battery from said supply circuit, an exit light, a circuit for energizing said exit light from said battery, an audible signal associated with said last mentioned circuit, said relay having a movable element jointly responsive to the voltage of said supply circuit and the charging current in said battery for urging said relay to circuit opening position and said movable element being responsive to the voltage of said supply circuit alone for urging said relay to circuit closing position.

CHESTER I. HALL.